(12) United States Patent
Cherian et al.

(10) Patent No.: US 9,503,856 B2
(45) Date of Patent: Nov. 22, 2016

(54) METHOD FOR DETERMINING WIRELESS DEVICE LOCATION BASED ON PROXIMATE SENSOR DEVICES

(75) Inventors: George Cherian, San Diego, CA (US); Hermanth Sampath, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/570,464

(22) Filed: Aug. 9, 2012

(65) Prior Publication Data

US 2013/0231130 A1  Sep. 5, 2013

Related U.S. Application Data

(60) Provisional application No. 61/606,737, filed on Mar. 5, 2012.

(51) Int. Cl.
| | | |
|---|---|---|
| *H04W 24/00* | (2009.01) | |
| *H04B 7/00* | (2006.01) | |
| *H04W 4/02* | (2009.01) | |
| *H04W 64/00* | (2009.01) | |

(52) U.S. Cl.
CPC .............. *H04W 4/025* (2013.01); *H04W 64/00* (2013.01)

(58) Field of Classification Search
CPC .......................... H04W 84/18; H04W 84/005
USPC ......... 455/456.1, 456.2, 456.3, 456.4, 456.5, 455/457, 41.2
See application file for complete search history.

(56) References Cited

U.S. PATENT DOCUMENTS

| | | | |
|---|---|---|---|
| 7,218,938 B1 | 5/2007 | Lau et al. | |
| 8,200,247 B1* | 6/2012 | Starenky et al. | .......... 455/456.3 |
| 2003/0054830 A1* | 3/2003 | Williams et al. | ............. 455/456 |
| 2004/0054732 A1* | 3/2004 | Carter | .................. G06Q 10/107 |
| | | | 709/206 |
| 2004/0229564 A1* | 11/2004 | Huang et al. | ................. 455/41.2 |
| 2005/0135292 A1 | 6/2005 | Graumann | |
| 2007/0082614 A1* | 4/2007 | Mock | ........................... 455/41.2 |
| 2007/0262863 A1* | 11/2007 | Aritsuka | ................ H04B 17/27 |
| | | | 340/539.22 |
| 2008/0208444 A1* | 8/2008 | Ruckart | ........................ 701/200 |
| 2010/0008286 A1* | 1/2010 | Abedi | ........................... 370/315 |

(Continued)

FOREIGN PATENT DOCUMENTS

| | | | |
|---|---|---|---|
| EP | 1206152 A2 | 5/2002 | |
| EP | 1293800 A1 | 3/2003 | |

(Continued)

OTHER PUBLICATIONS

Priyantha, "The Cricket Indoor Location System," Massachusetts Institute of Technology, Department of Electrical Engineering and Computer Science, pp. 1-199, May 19, 2005.

(Continued)

*Primary Examiner* — Omoniyi Obayanju
(74) *Attorney, Agent, or Firm* — Bala Ramasamy

(57) ABSTRACT

A method operational in a mobile device is provided for ascertaining location information for the mobile device by using captured/received locating information broadcast by local sensor devices. The method captures, at the mobile device, a message from a sensor device transmitted, for example, over a local wireless network. The method identifies a locating data in the message and may determine a location of the mobile device based on the identified locating data.

27 Claims, 7 Drawing Sheets

(56) References Cited

U.S. PATENT DOCUMENTS

| | | |
|---|---|---|
| 2010/0029305 A1* | 2/2010 | Gupta .......................... 455/466 |
| 2011/0159475 A1* | 6/2011 | West ................................ 435/3 |
| 2011/0171912 A1 | 7/2011 | Beck et al. |
| 2011/0183685 A1* | 7/2011 | Burton et al. ............. 455/456.1 |
| 2011/0210843 A1 | 9/2011 | Kummetz |
| 2012/0015665 A1 | 1/2012 | Farley et al. |
| 2012/0079018 A1* | 3/2012 | Rottler et al. ................ 709/204 |

FOREIGN PATENT DOCUMENTS

| | | |
|---|---|---|
| EP | 2237527 A1 | 10/2010 |
| WO | 0158098 A2 | 8/2001 |
| WO | 2005034557 A1 | 4/2005 |

OTHER PUBLICATIONS

Co-pending U.S. Appl. No. 09/500,189, filed Feb. 7, 2000.
International Search Report and Written Opinion—PCT/US2013/029160—ISA/EPO—Jun. 18, 2013.

\* cited by examiner

METHOD FOR DETERMINING WIRELESS DEVICE LOCATION BASED ON PROXIMATE SENSOR DEVICES

CLAIM OF PRIORITY UNDER 35 U.S.C. §119

The present application claims priority to U.S. Provisional Application No. 61/606,737 entitled "Method For Determining Wireless Device Location Based on Proximate Sensor Devices", filed Mar. 5, 2012, which is hereby expressly incorporated by reference herein.

BACKGROUND

Field

Various features relate to wireless communication devices and systems, and more particularly, to methods and apparatuses for determining accurate location of a wireless device.

Background

There is an ongoing need to improve the accuracy of location data for mobile devices. Currently, mobile devices use signals from access points (AP) to determine their locations. In particular, mobile devices use signal strength from several access points (e.g., at least 3 access points) to triangulate their approximate location. However, determining the location of mobile devices by using triangulation based on signals from access points has several drawbacks. First, each access point covers a large area (several miles), which limits the accuracy of the location data. Typically, the larger the coverage area of the access point, the less accurate the location data that is derived from signals from the access point. At best, using access points results in coarse location data. Second, because each access point covers a large area, access points are sparsely deployed. As a result, in certain areas (e.g., rural area) there may be only one access point within communicative reach of a mobile device. In which case, the mobile device cannot determine its exact location based on triangulation because there aren't enough access points. While increasing the number of access points in a given area (i.e., increasing the deployment density of access points in the area) might solve this problem, this approach is not a practical solution because access points are very expensive and consume at lot of power. Moreover, increasing the number of access points in a given area can lead to increase interference between the access points.

Therefore, there is a need for an improved method for determining the location of a mobile device. Ideally, such a method will result in more accurate location data for the mobile device and be more cost effective than installing additional access points.

SUMMARY

A method operational in a mobile device is provided for ascertaining location information for the mobile device by using captured/received locating information broadcast by local sensor devices. The method captures at the mobile device, a message from a sensor device transmitted, for example, over a local wireless network. The method identifies a locating data in the message and may determine a location of the mobile device based on the identified locating data.

In some implementations, capturing the message may include listening via the local wireless network, for messages from the sensor device intended for a different device and intercepting the message from the sensor device to the different device. In addition, determining the location of the mobile device may include identifying a corresponding location data in a reference map based on the locating data and identifying the location of the mobile device as the corresponding location data. The method may also include listening over at least two local wireless networks for messages that may be transmitted from the sensor device.

Additionally, capturing the message from the sensor device may include capturing at least one message from each sensor device from several sensor devices. In some implementations, identifying the locating data in the messages may include identifying locating data in at least one message of each sensor device from several sensor devices. Moreover, determining the location of the mobile device may include selecting the locating data within a message from at least one sensor device from the several sensor devices. In some implementations, determining the location of the mobile device may include performing a triangulation computation based on the identified locating data. Additionally, determining the location of the mobile device may include selecting a particular locating data associated with a particular message having the strongest signal and using the particular locating data to identify the location of the mobile device.

The mobile device and the sensor device communicate with each other via a local communication link, where the message from the sensor device is for the mobile device. In some implementations, the method requests a direct connection with the sensor device via the local wireless network and directly connects via the local wireless network with the sensor device. Moreover, capturing the message may include receiving the message from the sensor device, where the received message is intended for the mobile device. In addition, directly connecting via the local wireless network is performed after receiving a confirmation from sensor device, in some implementations. The method may also include receiving a request from the sensor device, for a direct connection with the sensor device via the local wireless network. The method may further include directly connecting via the local wireless network with the sensor device.

In some implementations, the identified locating data is a non-coordinate based location data. The identified locating data is a Global Positioning System (GPS) based location data in some implementations. The sensor device broadcasts the message within a limited range so that it is only captured by the mobile device when it is nearby. In some implementations, the method uses the location of the mobile device to provide navigational directions.

Some aspects provide a mobile device that includes a wireless communication interface for communicating over a local wireless network. The mobile device also includes a processing circuit coupled to the wireless communication interface. The processing circuit is adapted to capture at the mobile device, a message from a sensor device transmitted over the local wireless network. The processing circuit is adapted to identify a locating data in the message. The processing circuit is adapted to determine a location of the mobile device based on the identified locating data.

Some aspects further provide a mobile device that includes means for capturing at the mobile device, a message from a sensor device transmitted over a local wireless network. The mobile device includes means for identifying a locating data in the message. The mobile device includes means for determining a location of the mobile device based on the identified locating data.

Some aspects also provide a processor-readable storage medium having one or more instructions operational in a mobile device, which when executed by one or more processors causes the one or more processors to capture at the mobile device, a message from a sensor device transmitted over a local wireless network; identify a locating data in the message; and determine a location of the mobile device based on the identified locating data.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Overview

One way to achieve better location accuracy for a mobile device is to use data from non-access point devices. One such device is a sensor device. A sensor device is a device capable of measuring a physical property and/or event (e.g., temperature, humidity, light). In recent years, there has been a substantial increase in the deployment of sensor devices. These sensor devices are usually part of a smart-grid or network. The primary purpose of these sensor devices is to measure various physical properties and/or events (e.g., temperature, humidity, etc.) and transmit that information to a central system (e.g., remote server). These sensor devices communicate with the central system and/or with each other through a wired or local wireless network (e.g., WiFi). In some instances, when sensor devices communicate with each other, it is referenced to as machine-to-machine (M2M) communication.

Typically, sensor devices are fixed location devices. As such, the location of each device is known. Moreover, sensor devices are usually more densely deployed than access points and consume substantially less power than access points. Given the above, a mobile device can leverage the capabilities and properties of a sensor device infrastructure to compute more accurate location data for the mobile device.

Having described an overview of sensor devices, several implementations of using sensor devices to help mobile devices determine their location will now be further described below.

Exemplary Operating Environment

Figure 1:
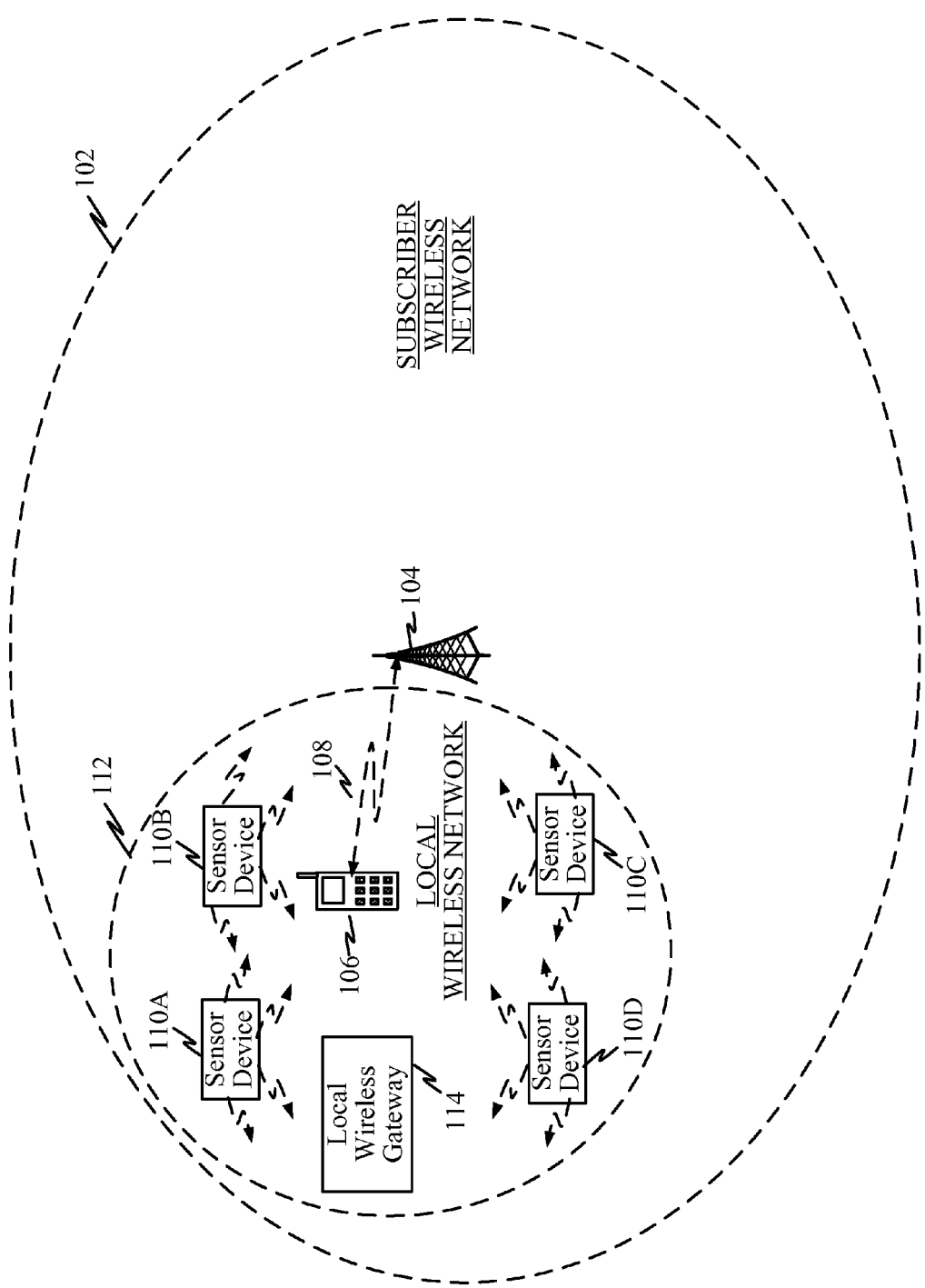
FIG. 1 is a conceptual diagram illustrating an example of a wireless network.

FIG. 1 illustrates an exemplary subscriber wireless communication network that a mobile device may be implemented in. A subscriber wireless network 102 may include an access point (AP) 104. In one implementation, the subscriber wireless network 102 is a cellular communication network. The access point 104 may provide one or more mobile devices access to the subscriber wireless network 102. For example, a mobile device 106 (e.g., mobile phone, wireless communication device, access terminal, etc.) may be adapted to setup a communication link 108 with the access point 104.

FIG. 1 also illustrates several sensor devices 110A-D. These sensor devices 110A-D measure physical properties and/or events (e.g., temperature) and periodically transmit that information to a central system (not shown). Typically, that information is transmitted via a local wireless network 112 (e.g., WiFi) to the central system through a local wireless gateway 114 (e.g., router, etc.). In addition to transmitting physical property/event data, the sensor devices 110A-D may also transmit location data of the sensor devices 110A-D. Examples of such location data includes coordinate system positions (e.g., Global Positioning System (GPS) position), and/or a description of the location of the sensor (e.g., Room 1). Relative to the access point 104, the sensor devices 110A-D have a much smaller communication range (usually a few feet or yards). However, there may be a large number of sensor devices (e.g., sensor devices 110A-D) deployed in a single coverage area of an access point (e.g., access point 104). When a mobile device is within a communication range of a sensor device, then the mobile device is relatively close to the sensor device, which means that the location of the sensor can be approximately the location of the mobile device. In contrast, a mobile device can be within communication range of an access point but may still be anywhere between a few meters to a kilometer away from the access point. While the primary purpose of sensor devices 110A-D may be something else (e.g., provide temperature readings, provide environmental information, provide customer/product activity/location information, etc.), they may also be used (by the mobile device 106) to obtain more accurate location data for the mobile device 106 than the access point 104. To achieve even better accuracy of the location of the mobile device, information (e.g., locating data within a message) from several sensor devices may be used instead of using information from a single sensor device. In such instances, the mobile device may use triangulation techniques on information from several sensor devices that are in the vicinity to obtain location data for the mobile device. The location data that is computed from these triangulation techniques is generally better than information from a single access point. In one example, the sensor devices 110A-D may periodically and/or continuously broadcast location information (e.g., regardless of the presence of a mobile device and/or wireless gateway).

When the mobile device 106 is within the vicinity of any one of the sensor devices 110A-D, the mobile device 106 can use location data captured from messages sent/broadcasted by the sensor devices 110A-D to determine its own location. In some implementations, the mobile device 106 connects directly with one or more of the sensor devices 110A-D. The direct connection is made via the local wireless network 112 (e.g., WiFi) and may be initiated by the mobile device 106 or anyone of the sensor devices 110A-D. A method of communicating between a mobile device and one or more sensor devices will be further described below with reference to FIG. 3.

In some implementations, sensor devices may transmit location information at relatively low power, thus limiting the range/distance (e.g., within 5 feet, 10, feet, 20 feet, 40 feet, etc.) at which the location information can be picked up (received) by mobile devices. The range may be limited based on the distance of a sensor device with respect to other sensor devices. Thus, a mobile device may rely on the proximity to the sensors devices detected to determine its own location. That is, by limiting the range that sensor devices can transmit location information, this limits the range (proximity) from which mobile devices can receive location information, thereby using the closest location information to obtain the most accurate mobile device location.

In some instances, once the connection between the mobile device 106 and at least one of the sensor devices 110A-D is established, the mobile device 106 receives a message from at least one the sensor devices 110A-D. As mentioned above, the message may include location data indicative of the location of the sensor device. Based on one or more location data, the mobile device 106 can determine its own location. A method of determining the location of a mobile device will be further described below with reference to FIG. 5.

In other instances, the mobile device 106 is not directly connected to any one of the sensor devices 110A-D (i.e., there is no local communication link between the mobile device 106 and any one of the sensor devices 110A-D). In such instances, the mobile device listens via the local wireless network 112 (e.g., WiFi,) for any message from a sensor device (e.g., sensor device 110A-D) intended for a different device (e.g., local router 114, other sensor device). When the mobile device 106 detects a message from any of the sensor devices 110A-D, the mobile device 106 intercepts the message and identifies location data included in the message. The location data can be coordinate system positions (e.g., GPS position), and/or an identifier for the sensor device that the mobile device 106 can derive a location from (e.g., ID value, description of location). For example, within a store the identifier may be an aisle number, etc., so that when the mobile device enters the store, it may download a map of the store, with location-coordinates representing aisle numbers, and when the mobile device obtains the aisle-number from the sensor device, it maps the location it receives from the sensor device to the location on the downloaded map. This mapping of location information within a venue may not facilitate just mobile device location but also permit a user to find a particular location. For example, in a stadium or theater, a user's mobile device may load a map of the venue (e.g., stadium or theater) and then use sensor devices, which are located throughout the venue and broadcast their location, to find the user's current location and/or a particular seat. The representation that is used to denote the location-coordinates in the map loaded on the mobile device is the same as that one transmitted by the sensor device.

A method of determining the location of a mobile device based on a message that is intercepted will be further described below with reference to FIG. 6.

It should be noted that location data that is sent in the message can be provided to the sensor device and included in the message in many ways. In some implementations, the sensor device has a geo-tagging functionality that allows the sensor device to determine it owns location. For example, the sensor device may be equipped with a GPS system that allows the sensor device to know its location and the sensor device includes that information when transmitting messages. In other implementations, the sensor device is remotely or locally programmed to include location data. Since the sensor device is typically a fixed location device, the location data needs only to be programmed once. Different implementations may program location data for the sensor device differently. In some implementations, the location data is entered when the sensor device is initially configured during a wireless communication setup (e.g., WiFi setup). In other implementations, the location data is remotely programmed by a user. As mentioned above, location data can be expressed and programmed in many ways, such as coordinate positions (e.g., GPS position), unique IDs, room name and/or number (e.g., conference room). In addition to location data, other data can also be programmed into the sensor device.

Having described some of the components involved in a wireless communication system, a wireless device will now be described in detail below with reference to FIG. 2.

Exemplary Wireless Device

Figure 2:
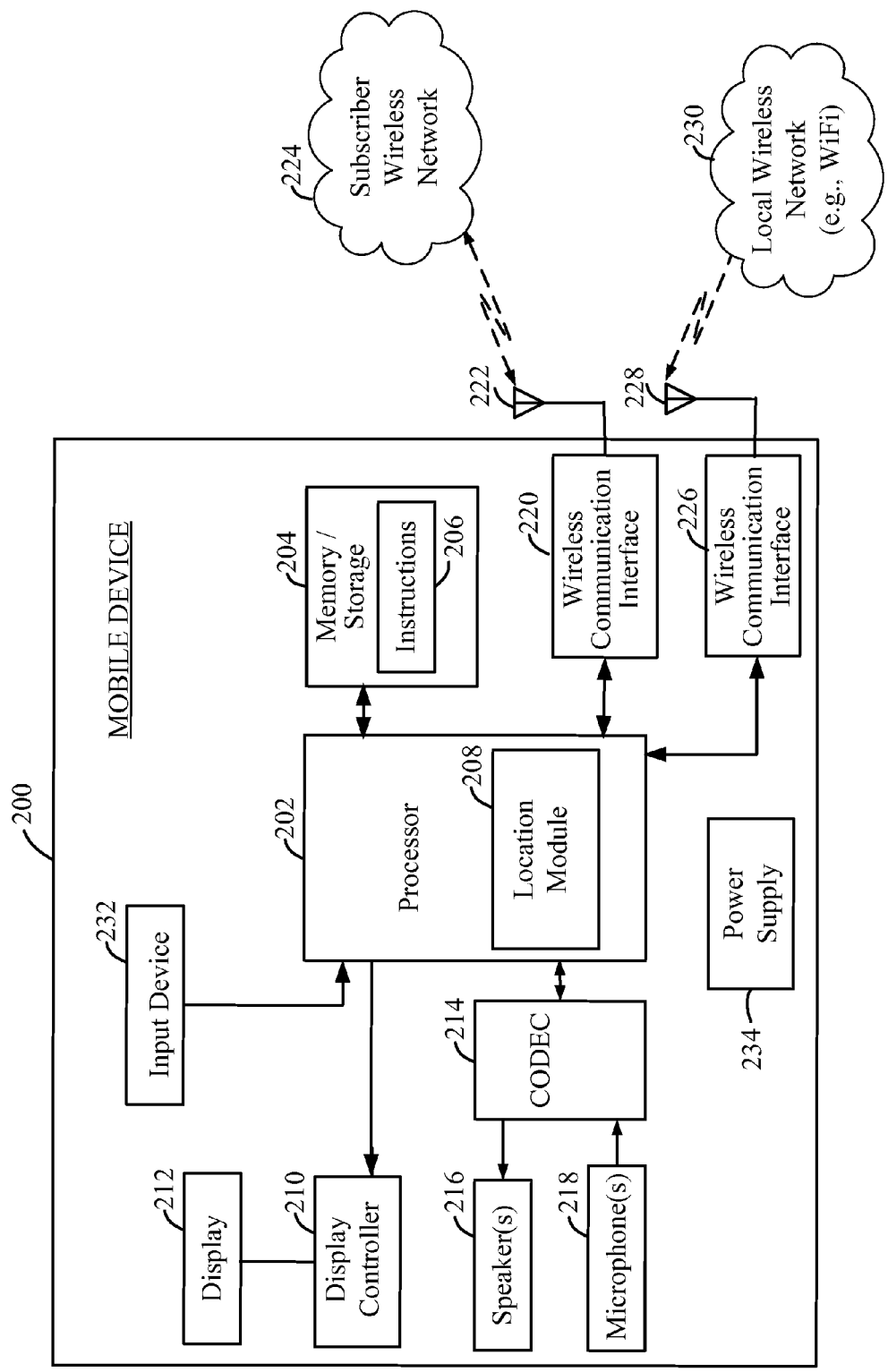
FIG. 2 is a block diagram illustrating an exemplary wireless device.

FIG. 2 is a block diagram illustrating an exemplary mobile device 200. In some implementations, the mobile device 200 is the mobile device 106 of FIG. 1. As shown in FIG. 2, the mobile device 200 includes a processor 202 (may also be a Digital Signal Processor (DSP)) that is coupled to a memory/storage 204 for storing information such as data for processing and transmission and instructions 206 for execution on the processor 202.

The processor 202 includes a location module 208 for processing location information. The location module 208 allows the mobile device to determine its location based on location data that it identifies in messages from sensor services. For example, when the location data stored in a message is something other than a GPS position, the location module 208 may associate the non-GPS location data with a pre-defined location stored in one or more databases stored in the memory/storage 204. As a non-limiting example, suppose the location data is simply the word "garage", the location module 208 would then look into a database to determine what "garage" is associated with. In some instances, the word "garage" could be associated with a GPS position or a location in pre-defined map (e.g., coordinate position of a grid representing a house or building).

FIG. 2 also illustrates a display controller 210 that may be coupled to the processor 202 and to a display device 212. A coder/decoder (CODEC) 214 can also be coupled to the processor 202. As non-limiting examples of user interface devices, a speaker 216 and a microphone 218 may be coupled to the CODEC 214. A wireless communication interface 220 may be coupled to the processor 202 and to an antenna 222. The wireless communication interface 220 allows the mobile device 200 to communicate with an external device via the antenna 222 and a subscriber wireless network 224 (e.g., cellular network). A wireless communication interface 226 may be coupled to the processor 202 and to an antenna 228. The wireless communication interface 226 allows the mobile device 200 to communicate with an external device via the antenna 228 and a local wireless network 230 (e.g., WiFi). An input device 232 may be coupled to the processor 202. The mobile device 200 may also include a power supply 234. Some implementations of the mobile device 200 may have additional components. For example, the mobile device 200 may have additional wireless communication interfaces and antennas.

Having described components of a mobile device, a flow diagram illustrating communication between a wireless device and a sensor device will now be described below.

Exemplary Operation of Wireless Device for Self-Location

Figure 3:
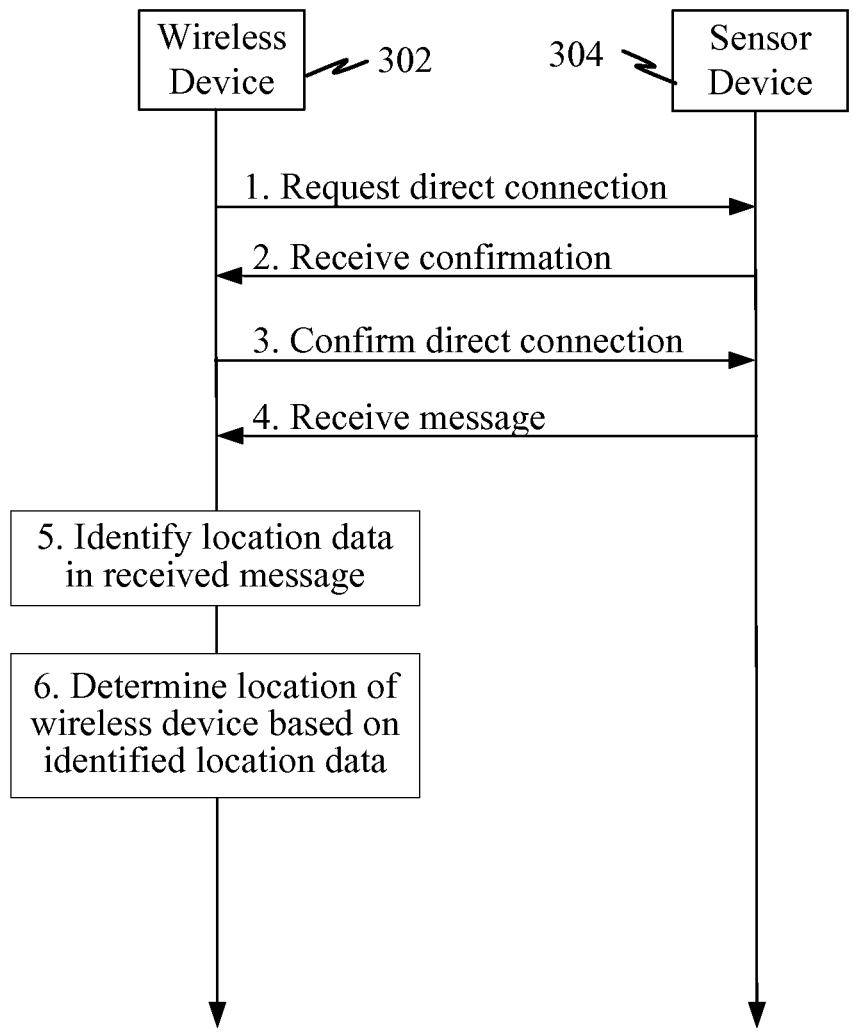
FIG. 3 is a flow diagram illustrating messages that may be performed when a wireless device communicates with at least one sensor device.

FIG. 3 illustrates a flow diagram between a wireless device 302 and a sensor device 304. As shown in this FIG, the wireless device 302 initiates via a local wireless network, communication with the sensor device 304 by requesting a direct connection with the sensor device 304. The wireless device 302 then received a confirmation from the sensor device 304. The confirmation is sent by the sensor device 304 in response to the request sent by the wireless device 302. In response to the confirmation from the sensor device 304, the wireless device 302 then sends its own confirmation of a direct connection with the sensor device 304. Once a connection is made (i.e., once a local communication link is established) the wireless device 302 then receives a message from the sensor device 304. The message may include various data, including location data, event data, and measurement data (e.g., temperature).

Once the message is received by the mobile device 302, the mobile device 302 identifies the location data stored in the received message. The mobile device 302 then determines its location based on the identified location data. In some implementations, the location of the mobile device 302 is the same as the location data stored in the received message. In other implementations, the location of the mobile device 302 is based on location data from messages from several sensor devices. In one example, the sensor device broadcast location information that is captured and/or intercepted by the mobile device. In other implementations, a sensor device may broadcast short beacons that allow mobile devices to connect to it and/or request, receive, and/or capture location broadcasts from the sensor device.

It should be noted that different implementations may perform communications between the wireless device 302 and the sensor device 304 differently. For example, it may be possible that the sensor device 304 initiates direct communication with the wireless device 302. In which case, the mobile device 302 would receive a request for a direct connection with the sensor device 304. In some implementations, location data may be received by the wireless device 302 before or during the confirmation response (from the sensor device 304) received by the wireless device 302. In other words, the location data may be received before a local communication link is established between the wireless device 302 and the sensor device 304.

Figure 4:
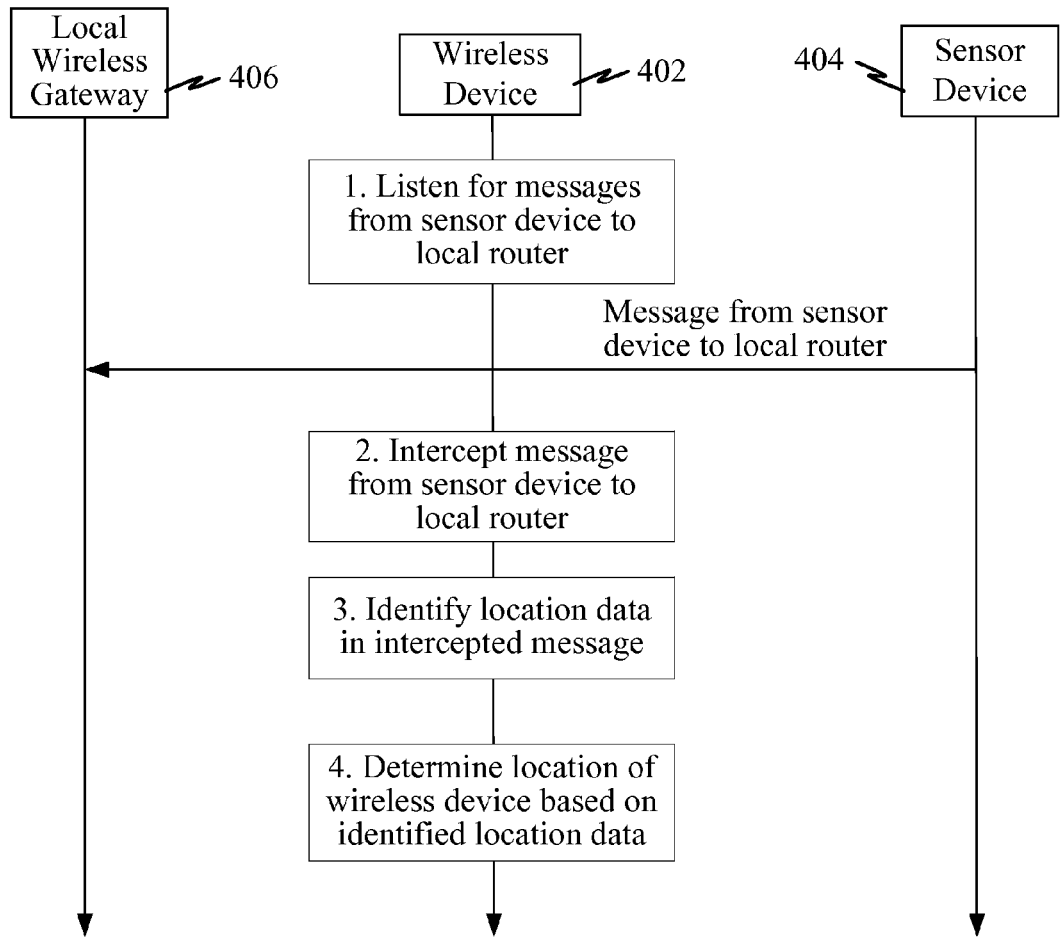
FIG. 4 is a flow diagram illustrating messages that may be performed when a sensor device communicates with an access point.

FIG. 4 illustrates another flow diagram in a local wireless network. As shown in this FIG, there is no direct local communication link between the wireless device 402 and the sensor device 404. Thus, there is no message that is being sent to the wireless device 402 from the sensor device 404. In the example illustrated in this FIG, the wireless device 402 listens for any messages from the sensor device 404 and a local wireless gateway 406. When a message from the sensor device 404 to the local wireless gateway 406 is detected, the mobile device 402 intercepts the message. After intercepting the message, the mobile device 402 identifies location data for the intercepted message. The mobile device 402 then determines its location based on the identified location data in the intercepted message.

In some implementations, the location of the mobile device 402 is the same as the location data stored in the intercepted message. In other implementations, the location of the mobile device 402 is based on location data from messages intercepted from several sensor devices. For example, the location of the mobile device may be based on simply one of the identified location data (e.g., location data from message from the closest sensor device or location data from a message having the strongest signal) or the location data could be based on a triangulation of several identified location data.

While FIG. 4 illustrates the mobile device 402 intercepting a message from a sensor device 404 to the local wireless gateway 406, the above flow diagram can also be applied to show a mobile device 402 intercepting a message from one sensor device intended to any another device (e.g., another sensor device). For example, the mobile device may enter into a sensor area (e.g., a store with deployed location sensors), and then the mobile device may obtain an address of a local wireless gateway so that it can intercept the messages from the sensor devices to the local wireless gateway.

In some instances, messages that are broadcasted/transmitted by the sensor devices and captured/intercepted by the mobile device are encrypted. This is done to protect against any rogue sensor device that may transmit a wrong locating data to mislead the mobile device. Some sensor devices may encrypt an entire message, while other sensor devices may only encrypt part of the message (e.g., the locating data stored in the message).

Different encryption schemes may be use to encrypt part of the message or the entire message transmitted/broadcasted by a sensor device. In some instances, the sensor device may encrypt part of a message (e.g., locating data in a message) or the entire message using a shared key. This shared key is shared between the sensor device and the mobile device. In some instances, the shared key is a combination of a public key, which is attached with the message and a private key that is specific to the mobile device. The mobile device may obtain the shared key or private key when the mobile device downloads a map for a venue/location. In other instances, the message or part of the message is encrypted using a private key and only a public key is necessary to decrypt the message or part of the message. To further increase the strength of the encryption, the key (e.g., shared key, public key) may be combined with another variable seed, such as "time" (e.g., hour, minute) to protect against replay attack.

Having described the flow of how messages are transmitted, a method for determining location based on the location data from a message from a sensor device will now be described below with reference to FIGS. 5-6.

Figure 5:
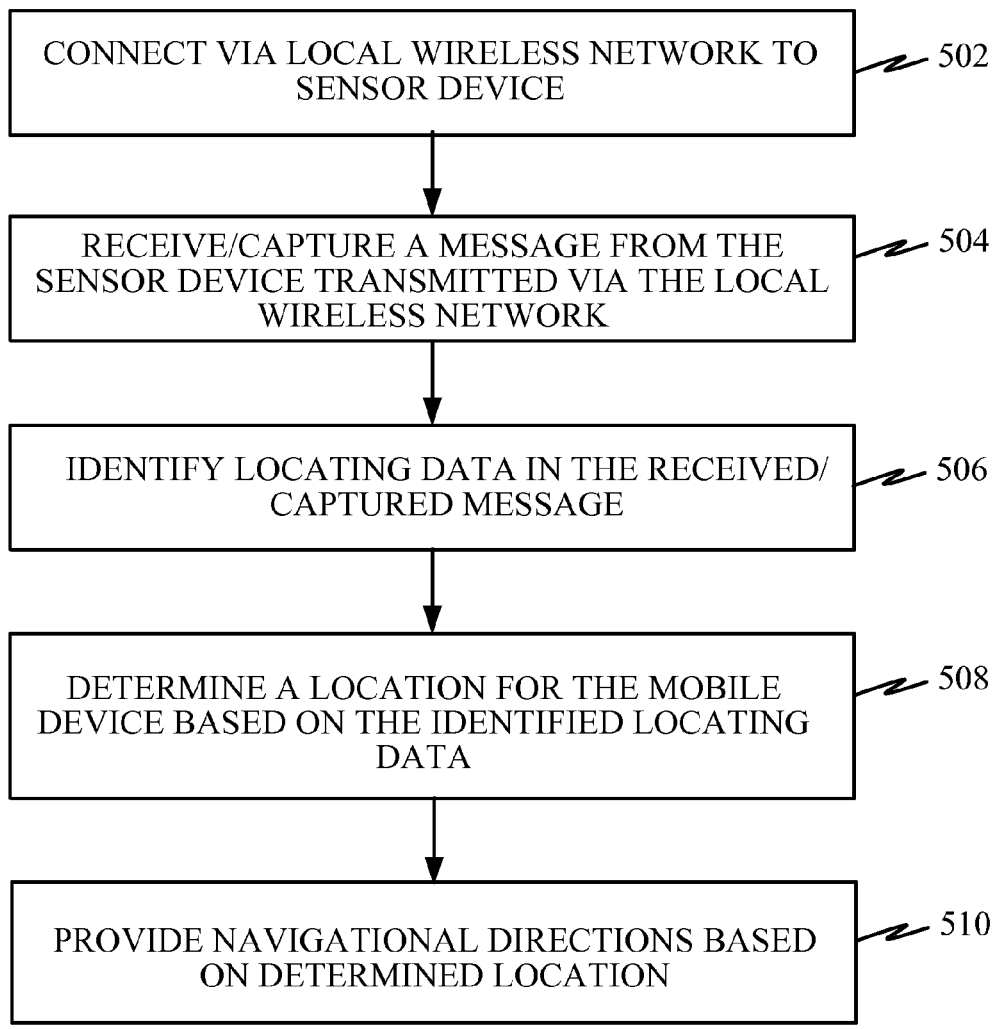
FIG. 5 is a flow diagram illustrating how location is determined according to one or more aspects of the present disclosure.

FIG. 5 illustrates a method operational in a mobile device to determine the location of the mobile device. As shown in FIG. 5, a connection is made via a local wireless network, with a sensor device 502. In some instances, the connection is made after several communication exchanges between the mobile device and the sensor device. In other instances, the connection between the mobile device and sensor device is made after one communication exchange. In alternative implementations, no connection is necessary; instead the mobile device simply captures/intercepts broadcasts from the sensor device(s) that may include locating information. Once the connection is made (i.e., once a local communication link is established), a message from the sensor device is received/captured via the local wireless network 504. The message may include several different types of data, including locating data (e.g., GPS coordinate, grid coordinate, room name and/or number), physical data, event data and/or measurement data (e.g., humidity, temperature).

Locating data may then be identified in the received/captured message 506. Such "locating data" may refer to any information that permits ascertaining an absolute and/or relative location for the receiving mobile device. When the mobile device is connected to more than one sensor device, messages (e.g., transmissions or broadcasts) from more than one sensor device may be received. In such instances, several different instances and/or types of locating data may be identified in one or more messages.

Once the locating data is identified, a location of the mobile device may be ascertained based on the identified locating data 508. When the locating data specifies a GPS coordinate, then the location of the mobile device is the GPS coordinate. Alternatively, if multiple instances of locating data are received/captured by the mobile device, then the locating data from the closest sensor device (e.g., ascertained from signal strength) may be used/selected. In other implementations, where multiple instances of locating data are received/captured by the mobile device, the mobile device may perform triangulation using the multiple instances of different locating data to ascertain a location. In yet other examples, both triangulation and signal strength (for each received/captured message) may be used to ascertain a location for the mobile device.

In some instances, the locating data in the message specifies a non-GPS coordinate (e.g., a room number, an isle or row, a particular store or floor or grid location), then the location of the mobile device may be determined by looking at a reference that specifies what the non-GPS coordinate represents (e.g., looking up a database to determine the location of the room number). For example, the reference that is looked at may be downloaded and stored on the mobile device in different ways. In some implementations, the reference is a database that maps the non-GPS coordinate to a GPS coordinate. The database may be downloaded by the mobile device upon entering a venue. This database may be part of an application that is stored on the mobile device in some implementations. Alternatively, the database may be separate from the application. The database and/or application may also be downloaded prior to entering the venue. In some implementations, when the application and/or database are downloaded when entering the venue, the download may be initiated through a near field communication (NFC) wireless network. That is, the appropriate application and/or database may be downloaded when the mobile device is near a near field communication interface (e.g., NFC device) located at the venue.

Note that, in some implementations, the sensor devices may transmit the location information (e.g., locating data) at low power such that the mobile device is able to capture, receive, and/or intercept such location information when sufficiently close to a particular sensor device. This allows the mobile device to capture primarily nearby location information (e.g., locating data) from proximate sensor devices.

Additionally, the mobile device may perform triangulation based on location information (e.g., non-GPS coordinates) received from multiple sensor devices. Such triangulation may consider both the location information as well as signal strength of each of the sensor devices providing a location in order to improve accuracy as well as determine a direction in which to move.

In some implementations, more than one locating data may be identified (e.g., when the mobile connects to, or captures messages from, more than one sensor device). When that occurs, the location of the mobile device may be based on several identified location data. For example, the identified location of the mobile device may be based on a triangulation of several instances of different locating data. Alternatively, the mobile device may select the locating data that is closest to it (e.g., based on the signal strength of the message received/captured).

After identifying a location for the mobile device, this information may be used in a number of ways. For instance, navigational directions may be provided (e.g., to a user of the mobile device) based on the identified location of the mobile device 510. In another example, the mobile device may report its location (e.g., via a broadcast, transmission of a message, and/or contacting a website) in order to receive location-based or location-specific content (e.g., discounts from the particular nearby store, specials near its current location, etc.). In another example, the mobile device location information may be transmitted or broadcasted (e.g., within the same venue) to allow others to know its location.

Figure 6:
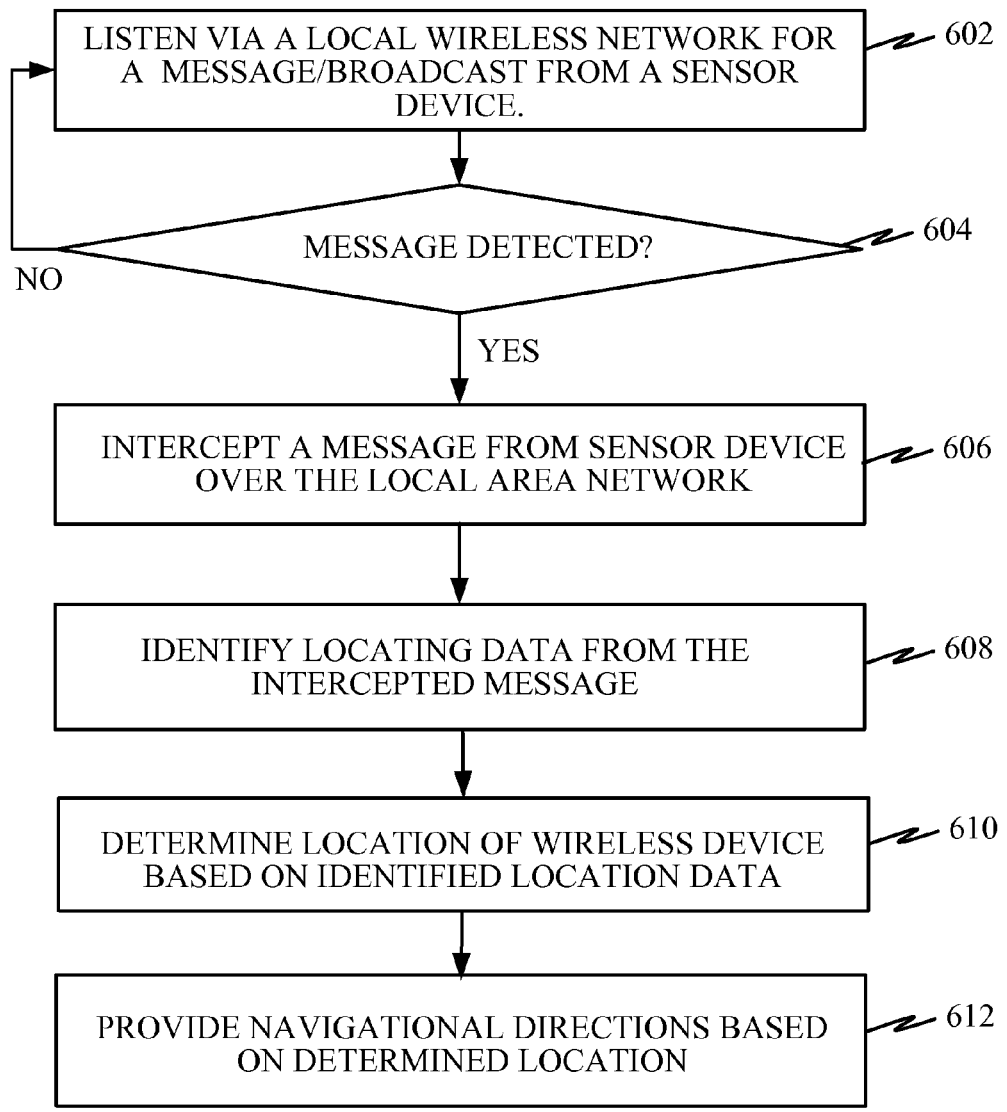
FIG. 6 is a flow diagram illustrating how location is determined according to one or more aspects of the present disclosure.

FIG. 6 illustrates another method operational in a mobile device to determine the location of the mobile device. The method shown in FIG. 6 may be implemented when there is no local communication link between a wireless device and a sensor device. As shown in this FIG, the mobile device may listen via a local wireless network for any messages/broadcasts from a sensor device 602 (e.g., where such messages/broadcasts are intended for a local router). A determination is made as to whether a message from the sensor device is detected 604. If no message is detected, the mobile device continues to scan or listen for any messages from the sensor device. However, when a message from the sensor device is detected, the message from the sensor device is intercepted 606. The intercepted message may include several different types of data, including locating data (e.g., GPS coordinate, grid coordinate, room name and/or number), physical data, event data and/or measurement data (e.g., humidity, temperature). Locating data as used herein refers to any information that can be used to identify a location of a device (e.g., sensor device and/or mobile device).

A locating data may then be identified in the received message 608. When one or more messages from more than one sensor device are detected, several one or more of these messages may be intercepted. In such instances, several instances of locating data may be identified (e.g., locating data is identified for each intercepted message that originated from a different sensor device).

Once the locating data is identified, a location of the mobile device is identified based on the identified location data 610. When the locating data specifies a GPS coordinate, then the location of the mobile device is the GPS coordinate. However, when the locating data in the message specifies a non-GPS coordinate (e.g., a room number), then the location of the mobile device may be determined by looking at a reference that specifies what the non-GPS coordinate represents (e.g., looking up a database to determine the location of the room number).

In some implementations, more than one locating data is identified (e.g., when messages from more than one sensor device are intercepted). When that occurs, the location of the mobile device is based on several identified locating data. For example, the identified location of the mobile device may be based on a triangulation of several instances of locating data. After identifying the location of the mobile device, navigational directions may be provided based on the identified location of the mobile device 612.

In some implementations, the above method can also be implemented on messages between two or more sensor devices. That is, in some instances, a first sensor device may communicate directly with a second sensor device. When that happens, the first sensor device may send a message directly to the second sensor device. The above method can be applied to intercept the message from the first sensor device and the second device. Additionally, the method described above may be implemented with combinations of messages that are from a sensor device to any other device over a local wireless network.

Different implementations may listen for messages between sensors devices and/or a local router differently. In some implementations, listening for messages may include listening for messages on a pre-determined communication link/network. In such an instance, the mobile device is aware of a particular communication network that the sensor devices and/or local router uses to communicate with each other and listens to that particular communication network for any messages to intercept.

The pre-determined communication network may be specified or made aware by an application that is designed to be used at a particular venue or location, and which has been downloaded and stored on the mobile device. This application may be downloaded at the venue or prior to arriving at the venue, through various means, including an online application store and/or website. In some instances, the application may be downloaded through a near field communication (NFC) link at the location. In this instance, when the mobile device is touching or near (e.g., within centimeters) an NFC device (e.g., NFC router), the application is downloaded and stored on the mobile device.

In addition to downloading an application and/or database, the above process may also include synchronizing data stored in the database and/or application with data that may be stored on a different device (e.g., computer at home). Synchronizing data may also include updating the application and/or the database (e.g., when sensor devices have been moved/replaced or if using a new mapping table).

In some implementations, listening for messages may include scanning for messages across several local communication networks. That is, the mobile device may listen across several local wireless networks to intercept any messages between sensors devices and/or a local router/gateway. In such instances, the mobile device may use location data from messages intercepted on different local wireless networks. Examples of local wireless networks include, but are not limited to, Bluetooth and WiFi.

Figure 7:
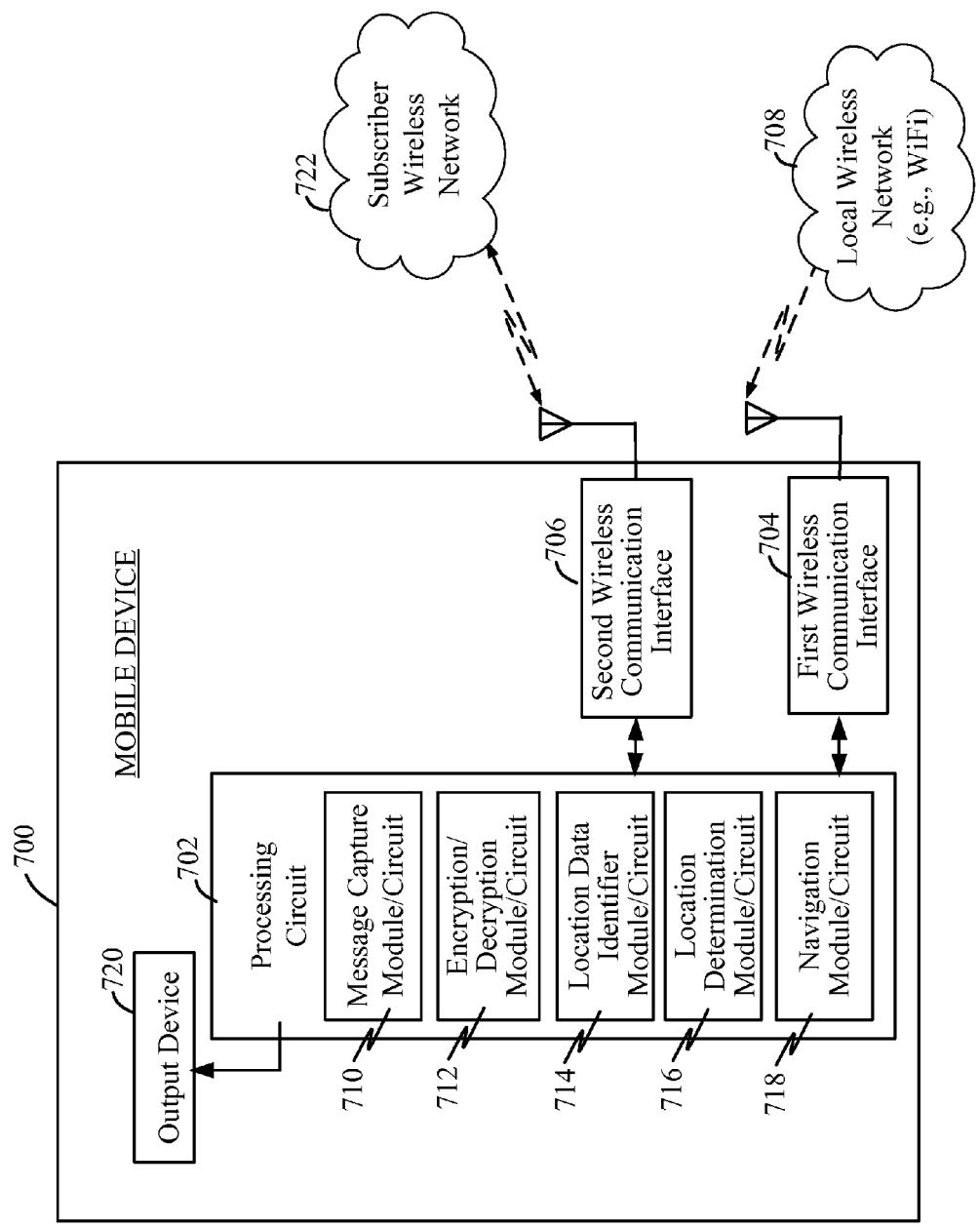
FIG. 7 is a block diagram illustrating an exemplary mobile device that may be configured to implement at least some features illustrated in FIGS. 5 and 6.

FIG. 7 is a block diagram illustrating an exemplary mobile device that may be configured to implement at least some features illustrated in FIGS. 5 and 6. The mobile device may include a processing circuit 702 coupled to a first wireless communication interface 704 and/or a second wireless communication interface 706. The first wireless communication interface 704 may serve to communicate over a local wireless network 708 (e.g., listen or scan for messages/broadcasts over the local wireless network). The processing circuit 702 may be adapted to listen/scan over one or more local wireless networks (e.g., via the first communication interface 704) for messages that may be transmitted from the sensor device. The mobile device 700 and the sensor device may communicate with each other via a local communication link (e.g., a direct link), wherein the message from the sensor device is for the mobile device.

The processing circuit 702 may include or implement a message capture module/circuit 710 that is adapted to capture messages from a sensor device transmitted over the local wireless network 708. For instance, capturing the message may comprise listening via the local wireless network, for messages from the sensor device intended for a different device and intercepting the message from the sensor device to the different device.

The processing circuit 702 may also include or implement an encryption/decryption module/circuit 712 that is adapted to decrypt any captured/intercepted message from a sensor device that may be encrypted. The encryption/decryption module/circuit 712 may use a key (e.g., public key) to decrypt an encrypted message that is intercepted or captured from a sensor device. In instances where the mobile device communicates with the sensor device, the encryption/decryption module/circuit 712 may also encrypt any messages or communications to the sensor device or any other device.

The processing circuit 702 may further include or implement a location data identifier module/circuit 714 that is adapted to identify a locating data in the received/captured message. In some examples, several messages from one or more sensor devices may be captured, and identifying the locating data in the message comprises identifying locating data in at least one message of each of the one or more sensor devices.

Additionally, a location determination module/circuit 716 may be adapted to determine a location of the mobile device based on the identified locating data. In one example, determining the location of the mobile device may comprise identifying a corresponding location data in a reference map based on the locating data and identifying the location of the mobile device as the corresponding location data.

In one example, the processing circuit 702 may further include a navigation module/circuit 718 that may be adapted to use the location of the mobile device to provide navigational directions. In one example, the navigation module/circuit 718 may output such navigational directions via an output device 720 (e.g., audio speaker, display screen, etc.).

In one example, the mobile device 700 may also include the second communication interface 706 adapted to communicate over a subscriber wireless network 722, wherein the processing circuit is coupled to the other wireless communication interface. The mobile device 700 may have additional wireless communication interfaces and antennas. These additional communication interfaces and antennas allows the mobile device 700 to communicate with sensor devices via other local wireless networks. For instance, these additional communication interfaces may allow the mobile device 700 to transmit, broadcast, listen, capture, and/or intercept messages across multiple local wireless networks at the same time.

For purposes of clarity, FIG. 7 illustrates only some of the modules/circuits that a processing circuit 702 may have. However, the processing circuit 702 may include other modules/circuits for performing any of the operations described above.

One or more of the components, steps, features and/or functions illustrated in the FIGs may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGs may be configured to perform one or more of the methods, features, or steps described in the FIGs. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. It should be noted that the foregoing embodiments are merely examples and are not to be construed as limiting. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a mobile device, comprising:
listening, at the mobile device, across multiple local wireless networks for messages transmitted between sensor devices or between one sensor device and a gateway to a central system;
intercepting, at the mobile device, a message not intended for transmission to the mobile device but transmitted from a sensor device over a local wireless network intended for a second sensor device or the gateway to the central system, wherein the sensor device is fixed in a geographic location and part of an interconnected network of sensor devices each configured to wirelessly transmit to one or more other sensor devices or the central system, wherein the message comprises temperature, humidity, or light data;
identifying locating data in the message, said locating data indicating a current location of the sensor device;
determining a location of the mobile device based on the current location of the sensor device provided within the message intercepted by the mobile device not intended for transmission to the mobile device but transmitted from the sensor device intended for the second sensor device or the gateway to the central system; and
performing a location based function at the mobile device based on the current location of the sensor device;
wherein determining the location of the mobile device comprises identifying corresponding GPS (Global Positioning System) location data in a reference map when non-GPS location data is provided in the message.

2. The method of claim 1, further comprising capturing a plurality of messages from a plurality of sensor devices.

3. The method of claim 2, further comprising identifying locating data in at least one message of each sensor device from the plurality of sensor devices.

4. The method of claim 3, wherein determining the location of the mobile device comprises determining the location of the mobile device based on the locating data in the message from the sensor device and locating data within a message from at least one sensor device from the plurality of sensor devices.

5. The method of claim 3, wherein determining the location of the mobile device comprises performing a triangulation computation based on the locating data from the sensor device and locating data from at least two other sensor devices from the plurality of sensor devices.

6. The method of claim 3, wherein determining the location of the mobile device comprises selecting a particular locating data associated with a particular message having the strongest signal and using the particular locating data to identify the location of the mobile device.

7. The method of claim 1, wherein the mobile device and the sensor device communicate with each other via a local communication link.

8. The method of claim 1, wherein the identified locating data is a non-coordinate based location data.

9. The method of claim 1, wherein the identified locating data is a Global Positioning System (GPS) based location data.

10. The method of claim 1, further comprising:
using the location of the mobile device to provide navigational directions.

11. The method of claim 1, further comprising:
requesting a direct connection with the sensor device via the local wireless network; and
directly connecting via the local wireless network with the sensor device.

12. The method of claim 11, wherein directly connecting via the local wireless network is performed after receiving a confirmation from the sensor device.

13. The method of claim 1, further comprising:
receiving a request from the sensor device, for a direct connection with the sensor device via the local wireless network; and
directly connecting via the local wireless network with the sensor device.

14. The method of claim 1, wherein the message is transmitted using a transmission power that is based on a distance between the sensor device and a different device.

15. The method of claim 1, further comprising determining at the mobile device whether the locating data is coordinate system position data or non-coordinate system location derivable identifier data, wherein the mobile device is configured to determine the current location of the sensor device based on coordinate system position data in response to a determination that the locating data is coordinate system position data, and is configured to determine the current location of the sensor device based on non-coordinate system location derivable identifier data in response to a determination that the locating data is non-coordinate system location derivable identifier data.

16. A mobile device comprising:
a wireless communication interface for communicating over a local wireless network; and
a processing circuit coupled to the wireless communication interface, the processing circuit adapted to:
listen, at the mobile device, across multiple wireless networks for messages transmitted between sensor devices or between one sensor device and a gateway to a central system;
intercept, at the mobile device, a message not intended for transmission to the mobile device but transmitted from a sensor device over a local wireless network intended for a second sensor device or the gateway to the central system, wherein the sensor device is fixed in a geographic location and part of an interconnected network of sensor devices each configured to wirelessly transmit to one or more other sensor devices or the central system, wherein the message comprises temperature, humidity, or light data;
identify locating data in the message at the mobile device, said locating data indicating a current location of the sensor device;
determine a location of the mobile device based on the current location of the sensor device provided within the message intercepted by the mobile device not intended for transmission to the mobile device but transmitted from the sensor device intended for the second sensor device or the gateway to the central system; and
perform a location based function at the mobile device based on the current location of the sensor device;
wherein the processing circuit is adapted to determine the location of the mobile device by identifying corresponding GPS (Global Positioning System) location data in a reference map when non-GPS location data is provided in the message.

17. The mobile device of claim 16, wherein the processing circuit is further adapted to:
use the location of the mobile device to provide navigational directions.

18. The mobile device of claim 16, wherein the processing circuit is further adapted to capture a plurality of messages from a plurality of sensor devices, wherein the processing circuit is further adapted to identify locating data in at least one message of each sensor device from the plurality of sensor devices, and wherein the processing circuit is further adapted to perform a triangulation computation to determine the location of the mobile device based on the locating data from the sensor device and locate data from at least two other sensor devices from the plurality of sensor devices.

19. The mobile device of claim 16, wherein the mobile device and the sensor device communicate with each other via a local communication link.

20. The mobile device of claim 16, further comprising another wireless communication interface for communicating over a subscriber wireless network, wherein the processing circuit is coupled to the other wireless communication interface.

21. The mobile device of claim 16, wherein the mobile device is configured to determine the current location of the sensor device based on coordinate system position data in response to a determination that the locating data is coordinate system position data, and is configured to determine the current location of the sensor device based on non-coordinate system location derivable identifier data in response to a determination that the locating data is non-coordinate system location derivable identifier data.

22. A mobile device, comprising:
means for listening, at the mobile device, across multiple local wireless networks for messages transmitted between sensor devices or between one sensor device and a gateway to a central system;
means for intercepting, at the mobile device, a message not intended for transmission to the mobile device but transmitted from a sensor device over a local wireless network intended for a second sensor device or the gateway to the central system, wherein the sensor device is fixed in a geographic location and part of an interconnected network of sensor devices each configured to wirelessly transmit to one or more other sensor devices or the central system, wherein the message comprises temperature, humidity, or light data;

means for identifying locating data in the message, said locating data indicating a current location of the sensor device;

means for determining a location of the mobile device based on the current location of the sensor device provided within the message intercepted by the mobile device not intended for transmission to the mobile device but transmitted from the sensor device intended for the second sensor device or the gateway to the central system; and means for performing a location based function at the mobile device based on the current location of the sensor device;

wherein the means for determining the location of the mobile device comprise means for identifying corresponding GPS (Global Positioning System) location data in a reference map when non-GPS location data is provided in the message.

23. The mobile device of claim 22, further comprising:
means for using the location of the mobile device to provide navigational directions.

24. The mobile device of claim 22, wherein the mobile device and the sensor device communicate with each other via a local communication link.

25. A processor-readable non-transitory storage medium having one or more instructions operational in a mobile device, which when executed by one or more processors causes the one or more processors to:

listen, at the mobile device, across multiple local wireless networks for messages transmitted between sensor devices or between one sensor device and a gateway to a central system;

intercept, at the mobile device, a message not intended for transmission to the mobile device but transmitted from a sensor device over a local wireless network intended for a second sensor device or the gateway to the central system, wherein the sensor device is fixed in a geographic location and part of an interconnected network of sensor devices each configured to wirelessly transmit to one or more other sensor devices or the central system, wherein the message comprises temperature, humidity, or light data;

identify locating data in the message, said locating data comprising a current location of the sensor device;

determine at the mobile device whether the locating data is coordinate system position data or non-coordinate system location derivable identifier data;

determine a location of the mobile device based on the current location of the sensor device provided within the message intercepted by the mobile device not intended for transmission to the mobile device but transmitted from the sensor device intended for the second sensor device or the gateway to the central system; and perform a location based function at the mobile device based on the current location of the sensor device;

wherein determining the location of the mobile device comprises identifying corresponding GPS (Global Positioning System) location data in a reference map when non-GPS location data is provided in the message.

26. The processor-readable non-transitory storage medium of claim 25, further comprising one or more instructions which when executed by the one or more processors causes the one or more processors to:
use the location of the mobile device to provide navigational directions.

27. The processor-readable non-transitory storage medium of claim 25, wherein the mobile device and the sensor device communicate with each other via a local communication link.

* * * * *